(12) United States Patent
Suzuki et al.

(10) Patent No.: US 8,320,085 B2
(45) Date of Patent: Nov. 27, 2012

(54) DISK DRIVE INCLUDING A LATCH CONFIGURED TO LOCK AN ACTUATOR IN RESPONSE TO AN EXTERNAL FORCE

(75) Inventors: Takao Suzuki, Kanagawa (JP); Nobuyuki Okunaga, Kanagawa (JP); Hiroki Kitahori, Kanagawa (JP); Kohji Takahashi, Kanagawa (JP)

(73) Assignee: Hitachi Global Storage Technologies, Netherlands B.V., Amsterdam (NL)

( * ) Notice: Subject to any disclaimer, the term of this patent is extended or adjusted under 35 U.S.C. 154(b) by 0 days.

(21) Appl. No.: 12/635,664

(22) Filed: Dec. 10, 2009

(65) Prior Publication Data

US 2011/0109997 A1   May 12, 2011

(30) Foreign Application Priority Data

Dec. 10, 2008   (JP) .................................. 2008-315114

(51) Int. Cl.
*G11B 5/54* (2006.01)
*G11B 21/22* (2006.01)
(52) U.S. Cl. .................................. 360/256.2; 360/264.8
(58) Field of Classification Search ............... 360/256.2, 360/264.8, 256, 264.7
See application file for complete search history.

(56) References Cited

U.S. PATENT DOCUMENTS

| | | | |
|---|---|---|---|
| 6,654,207 B2 * | 11/2003 | Hong et al. ................ | 360/256.2 |
| 2002/0075603 A1 | 6/2002 | Hanada et al. | |
| 2004/0130826 A1 | 7/2004 | Yoshikawa et al. | |
| 2005/0264941 A1 * | 12/2005 | Tsuda et al. ............... | 360/256.2 |
| 2005/0275973 A1 * | 12/2005 | Kim .......................... | 360/256.2 |
| 2008/0019052 A1 * | 1/2008 | Kohei ....................... | 360/256.2 |
| 2008/0192385 A1 | 8/2008 | Choi et al. | |
| 2008/0192386 A1 | 8/2008 | Hwang et al. | |
| 2008/0204941 A1 * | 8/2008 | Oh ............................ | 360/265.1 |

FOREIGN PATENT DOCUMENTS

| | | |
|---|---|---|
| JP | 10269725 | 10/1998 |
| JP | 2004005840 | 1/2004 |

* cited by examiner

*Primary Examiner* — Jefferson Evans

(57) ABSTRACT

A disk drive. The disk drive includes: a head for accessing a data recording area of a disk; an actuator for pivoting to move the head; a voice coil motor; and, a latch configured to lock the actuator from pivoting toward the data recording area in response to an external force. The voice-coil motor includes a voice coil, a magnet, and a yoke. The latch is positioned at a closed position when the actuator is positioned at a stand-by position, and is configured to pivot by application of a magnetic bias force with pivoting of the actuator from the stand-by position into proximity with the data recording area such that the latch is configured to stop at an open position. The yoke includes a protrusion which protrudes toward the magnetic body at the open position.

9 Claims, 10 Drawing Sheets

DISK DRIVE INCLUDING A LATCH CONFIGURED TO LOCK AN ACTUATOR IN RESPONSE TO AN EXTERNAL FORCE

CROSS-REFERENCE TO RELATED APPLICATION

This application claims priority from the Japanese Patent Application No. 2008-315114, filed Dec. 10, 2008, the disclosure of which is incorporated herein in its entirety by reference.

TECHNICAL FIELD

Embodiments of the present invention relate to a disk drive including a latch mechanism for locking an actuator which pivots by an external force in the disk drive.

BACKGROUND

In a hard disk drive (HDD), which is an example of a disk drive, a magnetic-recording head held by an actuator is positioned to a given track on a spinning magnetic-recording disk to read and write data. On the magnetic-recording disk, a data area where data are to be recorded is defined. At the shutdown of the HDD in a given utilization period, the magnetic-recording head is moved to a predetermined stand-by position outside the data area by the actuator, and is retained at the stand-by position during non-operation of the HDD to protect data on the data area.

If an HDD receives any impact from an external force during non-operation, the actuator may pivot by the impact so that the magnetic-recording head may return to the data area. At this time, the magnetic-recording head may destroy data. Therefore, HDDs have latch mechanisms for locking actuators to retain the actuators outside the data area, as is known in the art. Moreover, as representative latch mechanisms, magnetic latches and mechanical latches are known in the art.

Engineers and scientists engaged in HDD manufacturing and development are interested in the design of HDDs that employ latch mechanisms to preserve data integrity on the magnetic-recording disk to meet the rising demands of the marketplace for increased performance, and reliability.

SUMMARY

Embodiments of the present invention include a disk drive. The disk drive includes: a head for accessing a data recording area of a disk; an actuator for supporting the head and for pivoting to move the head; a voice coil motor; and, a latch configured to lock the actuator from pivoting on a pivot shaft toward the data recording area in response to an external force. The voice-coil motor includes a voice coil, a magnet, and a yoke. The yoke is disposed so as to overlap with the voice coil attached to the actuator in a direction parallel to the pivot axis of the actuator such that the yoke is configured to move the actuator in response to an electrical current flowing through the voice coil interacting with a magnetic field of the magnet. The latch is positioned at a closed position while being supported by a portion of the actuator when the actuator is positioned at a stand-by position, and is configured to pivot by application of a magnetic bias force which is induced by magnetic flux leakage from the voice coil motor such that the magnetic bias force magnetic bias force is configured to act on a magnetic body of the latch with pivoting of the actuator from the stand-by position into proximity with the data recording area such that the latch is configured to stop at an open position. The yoke includes a protrusion which protrudes toward the magnetic body at the open position and is located at a lower position than the magnetic body. The protrusion includes a tip increasing in height in the direction in which the magnetic body is configured to move toward the open position.

DESCRIPTION OF THE DRAWINGS

The accompanying drawings, which are incorporated in and form a part of this specification, illustrate embodiments of the invention and, together with the description, serve to explain the embodiments of the present invention:

FIG. 2(a) is a plan view schematically illustrating an actuator in proximity with a magnetic-recording disk, and a latch; and, FIG. 2(b) is a plan view schematically illustrating the actuator parking at a stand-by position, and the latch, in accordance with an embodiment of the present invention.

The drawings referred to in this description should not be understood as being drawn to scale except if specifically noted.

DESCRIPTION OF EMBODIMENTS

Reference will now be made in detail to the alternative embodiments of the present invention. While the invention will be described in conjunction with the alternative embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following description of embodiments of the present invention, numerous specific details are set forth in order to provide a thorough understanding of the present invention. However, it should be noted that embodiments of the present invention may be practiced without these specific details. In other instances, well known methods, procedures, and components have not been described in detail as not to unnecessarily obscure embodiments of the present invention. Throughout the drawings, like components are denoted by like reference numerals, and repetitive descriptions are omitted for clarity of explanation if not necessary.

Description of Embodiments of the Present Invention for a Disk Drive Including a Latch Configured to Lock an Actuator in Response to an External Force With relevance to embodiments of the present invention, a typical magnetic latch includes a mechanism for holding an actuator by a magnet embedded in a rubber portion attracting an iron slug attached to the distal end of the actuator. Sufficient magnetic force is provided to the magnetic latch to continue attracting the actuator so as to hold the actuator in the event of an impact. On the other hand, to reduce the amount of materials used, the magnet in a voice coil motor (VCM) may be reduced in size.

The smaller the magnet, the less the torque constant in the VCM. Thus, an HDD with a smaller VCM torque constant may not be able to exert sufficient torque for pulling the actuator away from the magnetic latch at the start-up of the HDD. On the other hand, if the attracting force is reduced so that the attracting force is no longer adequate to pull the actuator away from the magnetic latch, an issue may arise that the actuator cannot be held against an impact.

Mechanical latches lock actuators mechanically, so the functions are not affected by VCM magnets like the magnetic latches. Two-piece mechanical latches are known in the art as typical mechanical latches. A two-piece mechanical latch includes a mechanism in which a long lever and a short bar are combined and can cope with both clockwise and counter-clockwise external impacts. The long lever pivots by an inertial force induced by an external force; and, the short bar engaged with the long lever opens and closes with the motion of the long lever to lock the actuator.

In the two-piece mechanical latch, however, when an HDD is vibrating, the long lever may start vibrating exacerbating the vibration of the HDD. Moreover, for free pivotal movement of the long lever and because of a small mounting space for the long lever, a common long lever is not fixed in the axial direction but has an amount of play, which may cause large vibration. Such vibration of the mechanical latch may induce vibration of the actuator or the magnetic-recording head to cause an error in the HDD.

One-piece mechanical latches, which are referred to herein by the term of art, "single latches," can reduce the above-described issue of vibration in two-piece mechanical latches. A single latch may include a hook for engaging with the actuator; and, the one-piece structure that includes the hook pivots the actuator by magnetic force, or inertial force to open the single latch, or close the single latch, which in turn locks the actuator from pivoting in response to application of an external force, which is a force applied to the disk drive from outside, or external to, the disk drive, as is known in the art. Since a single latch does not have a component equivalent to the long lever, the single latch can suppress occurrence of vibration harmful to head positioning, even if the HDD is vibrating.

A typical single latch is closed when the actuator is at a stand-by position, locking the actuator which has a tendency to pivot toward the magnetic-recording disk because of an external impact. A torque in the direction to open the latch is constantly applied to the single latch by magnetic flux leakage from a VCM and a magnetic pin mounted on the single latch. In loading the actuator onto the magnetic-recording disk, as the actuator pivots, the single latch pivots together with the actuator because of the torque, turning from a closed state to an opened state.

To lock the actuator against various impacts from the external environment, a long time is provided for the single latch to be positioned where the single latch is able to lock the actuator. Reducing XY torque to act in the direction to open the single latch by magnetic flux leakage allows extending the time for the latch closure.

On the other hand, vibration in the pivot axis direction, which is the Z direction, may be suppressed even with a single latch. While the actuator is positioned in proximity with the magnetic-recording disk, vibration of the single latch is minimized to reduce the effect on head positioning. To suppress the Z-direction vibration of the open single latch, enhancement of a Z-direction attracting force caused by magnetic flux leakage from the VCM has useful effects on latch performance.

The force caused by the magnetic flux leakage from the VCM acts on a magnetic pin attached to the single latch. Changing the size and position of this magnetic pin provides a stronger Z-direction attracting force, but simultaneously, causes a stronger XY torque. To increase the vibration proof characteristics without degrading the latch function for locking the actuator, embodiments of the present invention reinforce the Z-direction attracting force without increasing the XY torque to act on the single latch.

In accordance with embodiments of the present invention, a disk drive includes a head for accessing a data recording area of a disk, an actuator for supporting the head and pivoting to move the head, a voice coil motor, and a latch configured to lock the actuator from pivoting on a pivot shaft toward the data recording area in response to an external force. In accordance with embodiments of the present invention, the voice-coil motor includes a voice coil, a magnet, and a yoke. In accordance with embodiments of the present invention, the yoke is disposed so as to overlap with the voice coil attached to the actuator in a direction parallel to the pivot axis of the actuator such that the yoke is configured to move the actuator in response to an electrical current flowing through the voice coil interacting with a magnetic field of the magnet. In accordance with embodiments of the present invention, the latch is positioned at a closed position while being supported by a portion of the actuator when the actuator is positioned at a stand-by position. In accordance with embodiments of the present invention, the latch is configured to pivot by application of a magnetic bias force which is induced by magnetic flux leakage from the VCM such that the magnetic bias force magnetic bias force is configured to act on a magnetic body of the latch with the pivot of the actuator from the stand-by position to above the data recording area such that the latch is configured to stop at an open position. In accordance with embodiments of the present invention, the yoke includes a protrusion which protrudes toward the magnetic body at the open position and is located at a lower position than the magnetic body. In accordance with embodiments of the present invention, the protrusion includes a tip increasing in height in the direction in which the magnetic body is configured to move toward the open position. Thus, in accordance with embodiments of the present invention, the protrusion having the above-described structure can prevent vibration of the latch while suppressing adverse effects on the latching capability of the latch for locking the latch.

In one embodiment of the present invention, the tip of the protrusion includes an end face of a slant increasing in height in the direction in which the magnetic body is configured to move toward the open position. Thus, in an embodiment of the present invention, vibration of the latch can be prevented while effectively suppressing adverse effects on the latching capability. Moreover, in an embodiment of the present invention, the protrusion includes an arm extending from a plate of the yoke toward the latch and a tab bent upward from the arm such that an end face of the tab is the end face of the slant. Thus, in an embodiment of the present invention, the position and angle of the end face can be easily set to a designated state.

In one embodiment of the present invention, the slant angle of the end face of the slant ranges from 30° to 45°. Thus, in an embodiment of the present invention, vibration of the latch can be prevented while effectively suppressing adverse effects on the latching capability. In an embodiment of the present invention, the normal to the slant is disposed toward a tangential direction to a path of the magnetic body at the open position. Thus, in an embodiment of the present invention, adverse effects on the latching capability can be reduced further.

In another embodiment of the present invention, the tip of the protrusion includes an apex at a highest position. Thus, in an embodiment of the present invention, vibration of the latch can be prevented while effectively suppressing adverse effects on the latching capability.

In another embodiment of the present invention, the tip of the protrusion includes a first-tier face and a second-tier face which is located next to the first-tier face in the direction of movement of the magnetic body toward the open position and is disposed at a higher position than the first-tier face. In another embodiment of the present invention, the protrusion includes an arm extending from a plate of the yoke toward the latch and a tab bent upward from the arm such that the end face of the tab includes the first-tier face and the second-tier face. Alternatively, in another embodiment of the present invention, the protrusion includes a horizontally extending arm and a pin standing on the top surface of the arm at a location away from the end of the arm such that the end of the top face of the arm is the first-tier face and the top face of the pin is the second-tier face. Thus, in an embodiment of the present invention, vibration of the latch can be prevented while effectively suppressing adverse effects on the latching capability.

Embodiments of the present invention provide suppression of vibration of a single latch for locking an actuator while suppressing an adverse effect on the latching capability of the single latch. In accordance with embodiments of the present invention, a HDD is subsequently described as an example of a disk drive, by way of example without limitation thereto. In accordance with embodiments of the present invention, the HDD includes a mechanical latch for locking an actuator from pivoting due to an inertial force induced by an external force. In an embodiment of the present invention, the mechanical latch is a one-piece mechanical latch that is a single latch. In an embodiment of the present invention, the single latch stops the pivotal movement of an actuator from pivoting toward a data area due to an inertial force induced by an external force to lock the actuator. In another embodiment of the present invention, a structure is provided in which a magnetic bias force is applied to a magnetic substance in the single latch. In an embodiment of the present invention, a yoke, which the VCM includes as a component portion, for the actuator includes a protrusion whose tip has a specific shape. In an embodiment of the present invention, this structure can suppress vibration of the latch while suppressing an adverse effect on the latching capability of the single latch. In accordance with embodiments of the present invention, before proceeding to describe in detail the structure of the single latch and the yoke for applying a magnetic bias force to the single latch, the configuration of a HDD within which the single latch is mounted is next described.

Figure 1:
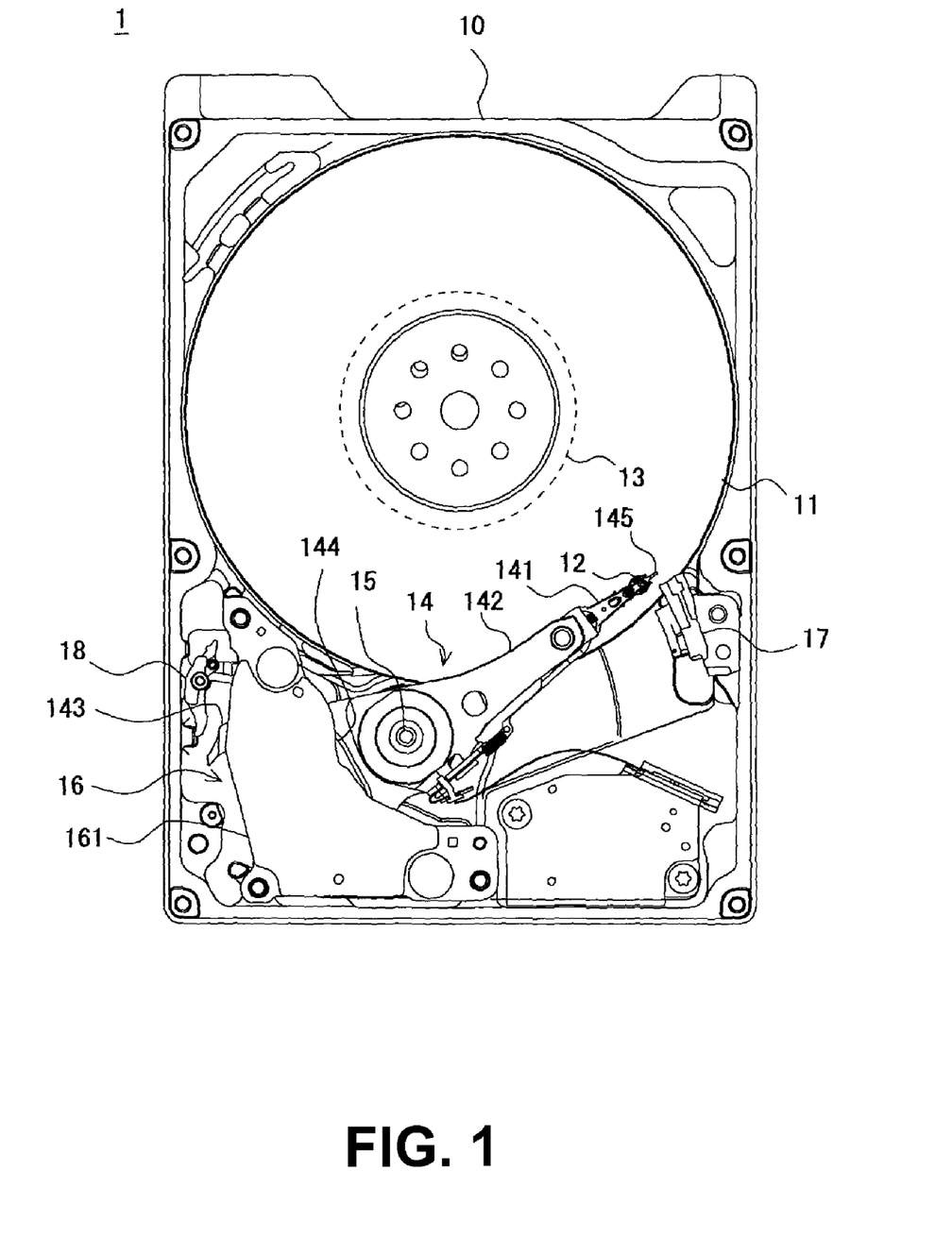
FIG. 1 is a plan view schematically depicting a configuration of a hard disk drive, in accordance with an embodiment of the present invention.

With reference now to FIG. 1, in accordance with an embodiment of the present invention, a plan view is shown that schematically depicts a configuration of HDD 1 with a mechanical latch 18 mounted within HDD 1. A base 10 of a disk enclosure (DE) is secured with a top cover (not shown), and houses components of HDD 1 in the DE. A spindle motor (SPM) 13 spins a magnetic-recording disk 11 at a specific angular rate. The magnetic-recording disk 11, an example of a disk for storing data, is attached to a rotatable spindle shaft for SPM 13. A head-slider 12, an example of a head, includes a slider and write and read elements of a magnetic-recording head attached to the slider.

An actuator 14 is pivotally held by a pivot shaft 15 and is driven by a VCM 16. The actuator 14 holds the head-slider 12 and pivots on the pivot shaft 15 to move the head-slider 12. The actuator 14 includes components of a suspension 141, an arm 142 which supports the suspension 141 and includes a bore for receiving the pivot shaft 15, a coil support 143, and a flat coil 144 on the inner peripheral side of the coil support 143, which are connected in this order from the distal end of the actuator 14 where the head-slider 12 is disposed. The VCM 16 includes the flat coil 144 and two magnets (not shown in FIG. 1) disposed so as to sandwich the flat coil 144 between the two magnets with space allowed for the rotary motion of the actuator 14, to which the flat coil 144 is attached, upon passage of an electrical current through the flat coil 144. The VCM includes a voice coil, which is the flat coil 144, at least one magnet, and a yoke. The yoke is disposed so as to overlap with the voice coil, which is the flat coil 144, attached to the actuator 14 in a direction parallel to the pivot axis of the actuator 14 such that the yoke is configured to move the actuator 14 in response to an electrical current flowing through the voice coil, which is the flat coil 144, interacting with a magnetic field of the magnet, or magnets. FIG. 1 shows an upper yoke 161 for holding the upper magnet. In this regard, however, only one magnet may be disposed on either a lower or an upper side.

As exemplified in FIG. 1, the actuator 14 moves the head-slider 12 over the data area of the spinning magnetic-recording disk 11 to allow the head-slider 12 to access the data recording area. As used herein, "access" is a term of art that refers to operations in seeking a data track of a magnetic-recording disk 11 and positioning a magnetic-recording head on the data track for both reading data from, and writing data to, a magnetic-recording disk 11. Pivotal movement of the actuator 14 allows the head-slider 12 to move along a nominally radial direction of the surface of the magnetic-recording disk 11. Typically, the head-slider 12 flies in proximity to the magnetic-recording disk 11.

A ramp 17 is disposed at the outer periphery of the magnetic-recording disk 11, along side of the magnetic-recording disk 11. When HDD 1 does not access data that is when HDD 1 does not read data or write data, such as during non-operation or in an idling state, the actuator 14 is at a stand-by position on the ramp 17. In unloading the head-slider 12, the actuator 14 pivots away from being in proximity with the data area of the magnetic-recording disk 11 toward the ramp 17, which is clockwise in FIG. 1; a tab 145 at the distal end of the actuator 14 slides and moves over the ramp 17; and, the actuator 14 stops at the stand-by position. At this time, the head-slider 12 is positioned away from the magnetic-recording disk 11. In loading, the actuator 14 pivots in the direction reverse from the one in unloading to move the head-slider 12 into proximity with the data area of the magnetic-recording disk 11.

When the actuator 14 is at the stand-by position and HDD 1 receives an impact from an external force, the actuator 14 may pivot by an inertial force so that the actuator 14 and the head-slider 12 may move into proximity with the data area of the magnetic-recording disk 11. If the actuator 14 is suddenly loaded from the ramp 17, the head-slider 12 vibrates severely. Then, the data in the data area, the head-slider 12, or the suspension 141 is more likely to be damaged. A single latch 18, which is referred to herein as a latch, latches the actuator 14 from pivotal movement, so that the head-slider 12 or the suspension 141 will not move into proximity with the data area of the magnetic-recording disk 11 because of the external force.

Figure 2:
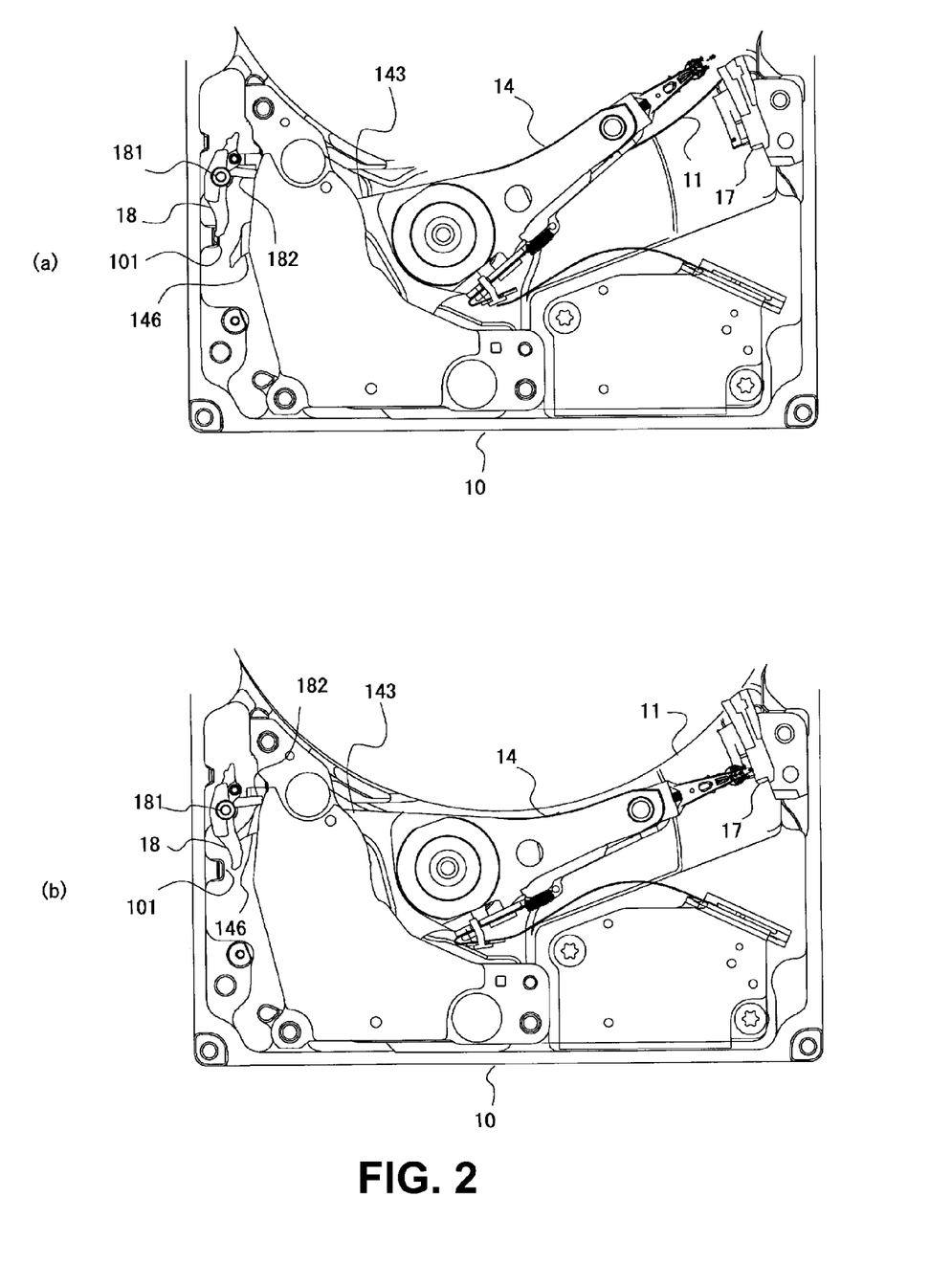

With reference now to FIGS. 2(a) and 2(b), in accordance with an embodiment of the present invention, a plan view is shown in FIG. 2(a) that schematically depicts an actuator 14 brought into proximity with the magnetic-recording disk 11 and the latch 18 still in an open state; and, in FIG. 2(b), a plan view is shown that schematically depicts an actuator 14 parking at the stand-by position on the ramp 17 and the latch 18 still in a closed state. The latch 18 pivots on a pivot shaft 181. As shown in FIG. 2(a), when the actuator 14 is brought into proximity with the magnetic-recording disk 11, the latch 18 is open. In contrast, when the actuator 14 is positioned at the stand-by position, the latch 18 is closed as shown in FIG. 2(b). The closed latch 18 when the actuator 14 stays at the stand-by position enables the latch 18 to lock the actuator 14 more securely when an external impact is applied.

When the latch 18 is on the path of the actuator 14, the latch 18 is in a closed state; and when the latch 18 is off the path, the latch 18 is in an open state. Accordingly, while the actuator pivots from the stand-by position into proximity with the magnetic-recording disk, the latch 18 pivots; and in the course of the pivotal movement, the latch 18 is switched from the closed state into the open state. When the actuator 14 is parking at the stand-by position, the position, which is a state, of the latch 18 which is still in the closed state is referred to by the term of art, "stand-by closed position," which is a state of the latch 18. When the actuator 14 is in proximity with the data area of the magnetic-recording disk, the position, which is a state, of the latch 18 which is still in the open state is referred to by the term of art, "still open position," which is a state of the latch 18.

When the actuator 14, to which the head-slider 12 is attached, is unloaded from being in proximity with the magnetic-recording disk to the stand-by position (moved from the position shown in FIG. 2(a) to that shown in FIG. 2(b)), the edge on the magnetic-recording disk 11 side of the coil support 143 makes contact with and pushes a bar 182 of the latch 18. The actuator 14 pivoting clockwise pushes the latch 18 to pivot counterclockwise, causing the latch 18 in the still open state to turn into the stand-by closed state.

Figure 3:
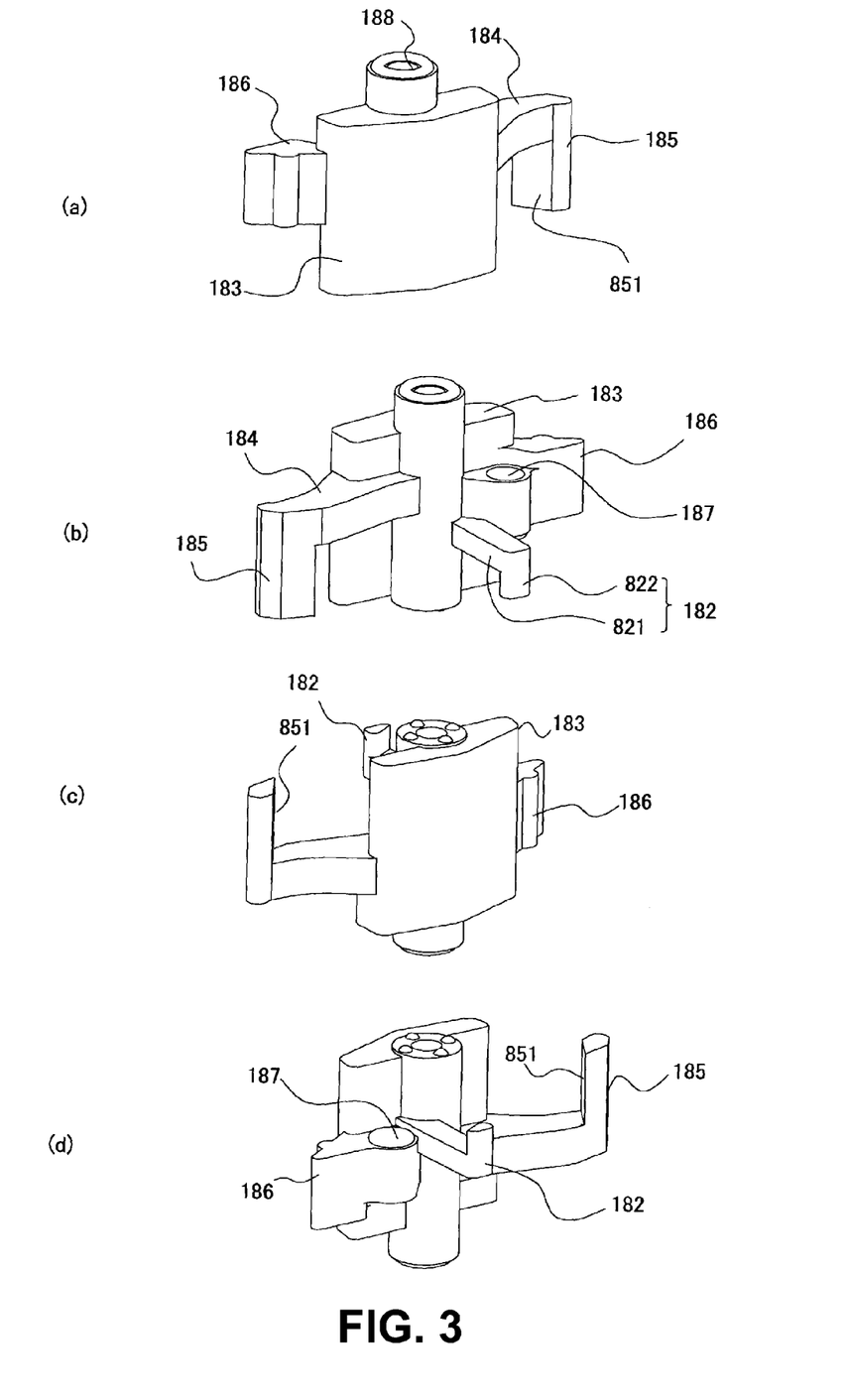
FIGS. 3(a), 3(b), 3(c) and 3(d) are perspective views depicting a structure of a single latch, in accordance with an embodiment of the present invention.

With reference now to FIGS. 3(a), 3(b), 3(c) and 3(d), in accordance with an embodiment of the present invention, perspective views are shown that illustrate the structure of the latch 18. FIGS. 3(a) and 3(c) illustrate the structure of the latch 18 on the opposite side to the inner wall of the base. FIGS. 3(b) and 3(d) illustrate the structure of the latch 18 on the opposite side to the actuator 14. In FIGS. 3(a) and 3(b), the lower side of each figure corresponds to the bottom side of the base 10 and the upper side corresponds to the top cover side. In FIGS. 3(c) and 3(c), the upper side of each figure corresponds to the bottom side of the base 10 and the lower side corresponds to the top cover side.

The latch 18 is a one-piece mechanical latch and includes: a bar 182, a body 183, an arm 184, a latch hook 185, a counter weight 186, and a pin 187 made of a magnetic substance. The components except for the pin 187 form a one-piece structure, which is typically formed by integrally molding a resin such as polyacetal. A bore 188 is formed in the body 183 to receive the pivot shaft 181 for the latch 18.

The bar 182 for contacting the coil support 143 in unloading, which was described referring to FIGS. 2(a) and 2(b), includes an arm 821 protruding from the body 183 toward the actuator 14 and a tab 822 extending vertically downward from the arm, where the reference numerals are shown in FIG. 3(b). Specifically, the coil support 143 makes contact with the tab 822 of the bar 182. Since the contact surface of the tab 822 to the coil support 143 is curved, even if pivotal movement of the actuator 14 displaces the contact point to the coil support 143, proper contact can be achieved at any position.

The arm 184 extends from the body 183 in a direction vertical to the pivot shaft 181 and a latch hook 185 is formed at the end of the arm 184, extending vertically downward. The latch hook 185 engages with the hook 146 of the actuator 14 to lock the actuator 14 which pivots toward the magnetic-recording disk 11 when an external force is applied to HDD 1. As shown in FIGS. 2(a) and 2(b), the actuator hook 146 is formed on the coil support 143. More specifically, the actuator hook 146 is located at the rear end on the magnetic-recording disk 11 side of the coil support 143. The pivot shaft 15 for the actuator 14 is located between the head-slider 12 and the actuator hook 146.

The latch hook 185 and the tab 822 of the bar 182 are formed to have a specific angle around the bore 188 for the pivot shaft. The counter weight 186 is formed at the opposite side of the latch hook 185 across the pivot shaft 181 and places the center of gravity of the entire latch 18 within the diameter of the bore 188 for the pivot shaft.

A pin 187 is inset near the bar 182. The pin 187 is a magnetic substance such as iron, nickel, or an alloy of iron and nickel, and is attracted by the magnetic force of the magnets in the VCM 16. Referring to FIGS. 2(a) and 2(b), the latch 18 receives a bias force which pivots the latch 18 clockwise on the pivot shaft 182. This bias force maintains the latch 18 in the still open state when the actuator 14 is brought into proximity with the magnetic-recording disk 11 as shown in FIG. 2(a). In FIG. 2(a), the latch 18 is in the most open state and the latch hook 185 is at the position closest to a side wall 101 of the base 10. Specifically, the tip of the latch hook 185 is in contact with the protrusion on the side wall 101 of the base 10.

As shown in FIG. 2(b), the latch 18 is maintained at a stand-by closed position with the coil support 143 being in contact with the bar 182 of the latch 18 at the stand-by position. The latch hook 185 extends vertically downward and the arm 184 supporting the latch hook 185 is above the actuator hook 146 formed on the coil support 143 so as to overlap each other three-dimensionally.

The method of loading the actuator 14 from the stand-by position is next described. After HDD 1 has been booted up and the magnetic-recording disk 11 has reached steady rotation, the actuator 14 starts pivoting from the stand-by position counterclockwise in FIGS. 2(a) and 2(b) on the pivot shaft 15 at a specific speed. The latch 18 pivots clockwise by the magnetic bias force acting from the VCM 16 to the pin 187 with pivotal movement of the actuator 14 so that the latch hook 185 is maintained in contact with the inner side wall 101 of the base 10 (FIG. 2(a)).

The method of unloading the actuator 14 from being in proximity with the magnetic-recording disk is next described. The actuator 14 pivots clockwise on the pivot shaft 15, rides on the ramp 17, and stops at the stand-by position. In the pivotal movement of the actuator 14, the left end of the coil support 143 makes contact with the bar 182 of the latch 18 to pivot the latch 18 counterclockwise. In the stand-by position, the latch hook 185 is placed on the motion path of the actuator hook 146 so that the latch 18 is in a closed state (FIG. 2(b)). In this way, in the stand-by position, the latch hook 185 is disposed so as to prevent the actuator 14 from pivoting in the direction of loading the head-slider 12 from above the ramp 17 to being in proximity with the magnetic-recording disk 11.

The behavior of the latch 18 and the actuator 14 when HDD 1 in a non-operational state receives an external force is next described. The external force includes various directional components of force and also moment for rotating HDD 1. When the actuator 14 receives such moment, the actuator 14 pivots toward the magnetic-recording disk 11, which is a counterclockwise pivotal movement, or pivots away from the magnetic-recording disk 11, which is a clockwise pivotal movement, depending on the direction of the moment. In this way, the actuator 14 can pivot in either direction by an inertial force induced by an external force; but, the actuator pivoting clockwise hits a crash stop and pivots counterclockwise as a bounce. The latch 18 locks these counterclockwise pivotal movements of the actuator 14.

If the actuator 14 pivots toward the magnetic-recording disk 11, the latch 18, as described above, pivots in the direction to open, which is clockwise, by magnetic bias force. However, if the actuator receives an external force and starts pivoting counterclockwise, the latch hook also pivots counterclockwise even though the magnetic bias is applied clockwise. The latch hook 185 is on the movement path of the actuator hook 146 and is in a closed state. Then, the latch hook 185 can catch the actuator hook 146, so that the head-slider 12 will not be loaded into proximity with the magnetic-recording disk 11.

In this way, the operation of the latch 18 is based on the time duration for the latch 18 to pivot from the stand-by closed state to an open state. The open state in this situation indicates an open state when the pivoting latch 18 turns from a closed state into an open state. In loading, slower pivotal movement of the actuator 14 relative to the time duration for opening of the latch 18 allows the latch 18 to be released. When HDD 1 receives an external impact, the latch 18 locks the actuator 14 on the basis of a sufficiently shorter time duration of pivotal movement of the actuator 14 than the above-described time duration, namely a faster pivoting speed, at an impact, and counterclockwise pivotal movement of the latch 18 in response to the impact.

Figure 4:
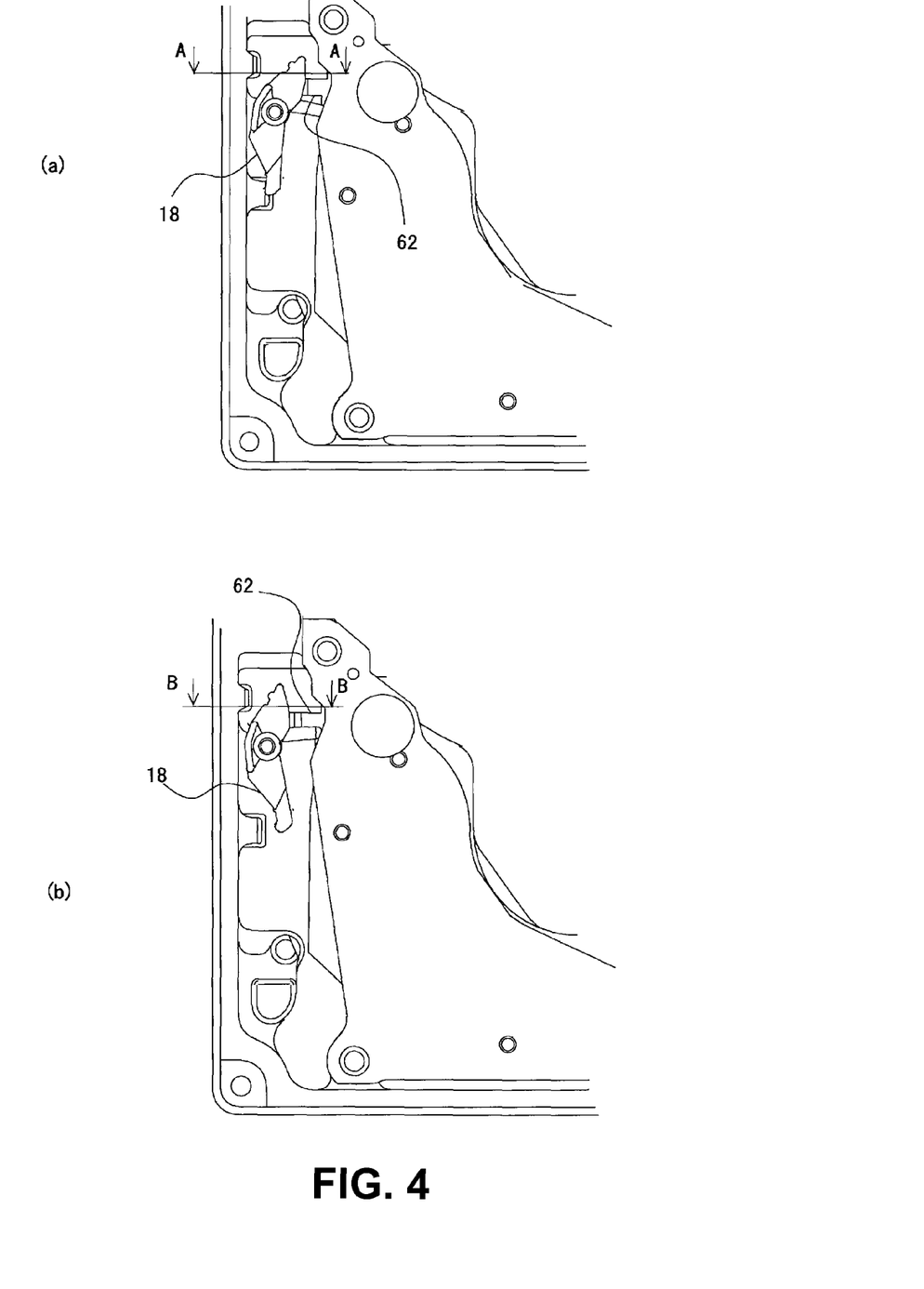
FIGS. 4(a) and 4(b) are drawings showing the latch in an open state, and the latch in a closed state, respectively, in accordance with an embodiment of the present invention.

With reference now to FIGS. 4(a) and 4(b), in accordance with an embodiment of the present invention, drawings are shown that show the latch in an open state and the latch in a closed state, respectively, in a method of application of a magnetic bias force from the VCM 16 to the latch 18. FIG. 4(a) is a partial enlarged view of HDD 1, showing the latch 18 in the still open position when the actuator 14 is in proximity with the magnetic-recording disk. FIG. 4(b) is a partial enlarged view of HDD 1, showing the latch 18 being still at the stand-by close position when the actuator 14 is at the stand-by position. In FIGS. 4(a) and 4(b), the actuator 14 is not shown to facilitate the discussion. As described above, in loading the actuator 14, which is moving the actuator 14 into proximity with the magnetic-recording disk, the latch 18 pivots in response to a magnetic bias force induced by magnetic flux leakage from the VCM 16, turning from the stand-by closed state (FIG. 4(b)) into the still open state (FIG. 4(a)).

High performance is provided for the latch 18 by the following two performance attributes: one is latching capability for locking the actuator 14 which pivots from the stand-by position toward the magnetic-recording disk 11 by an external force, and the other is vibration proof characteristics. The vibration of itself caused by an external impact or vibration may become a vibratory source harmful to head positioning. The magnetic bias force from the VCM 16 is a factor for determining these two properties.

To increase the latching capability, the time is extended when the latch 18 stays in the closed state, which is the state allowing the actuator 14 to be latched. To this end, in an embodiment of the present invention, the XY torque of the latch caused by the magnetic bias force is small. The magnetic bias force is a force for attracting the latch 18 into an open state. Accordingly, the XY torque is a torque when the latch 18 pivots on the pivot shaft 181 to open; and, reduction in XY torque provides a longer time for the latch to be closed.

On the other hand, to increase the vibration proof characteristics, the Z-direction component in the magnetic bias force may be increased. The latch 18 is inserted into the shaft 181 from the top cover side and the undersurface of the latch 18 is in contact with a mounting surface of the base. Accordingly, increase in the Z-direction magnetic bias force toward the bottom of the base leads to restriction of small movement of the latch 18, preventing occurrence of vibration harmful to head positioning. When the actuator 14, which is attached to the head-slider 12, is in proximity with the magnetic-recording disk, the latch 18 is in the still open state (FIG. 4(a)). Accordingly, the Z-direction component of the magnetic bias force to the latch 18 is increased in the still open state.

As understood from the above description, the magnetic bias force from VCM 16 to act on the latch 18 has a large Z-direction component on the latch 18 in the still open state. On the other hand, even if the Z-direction magnetic bias force on the latch 18 in the still open state is increased, the XY torque to turn the latch 18 from a closed state to an open state is not increased, or the amount of increase in the XY torque is minimized.

Figure 5:
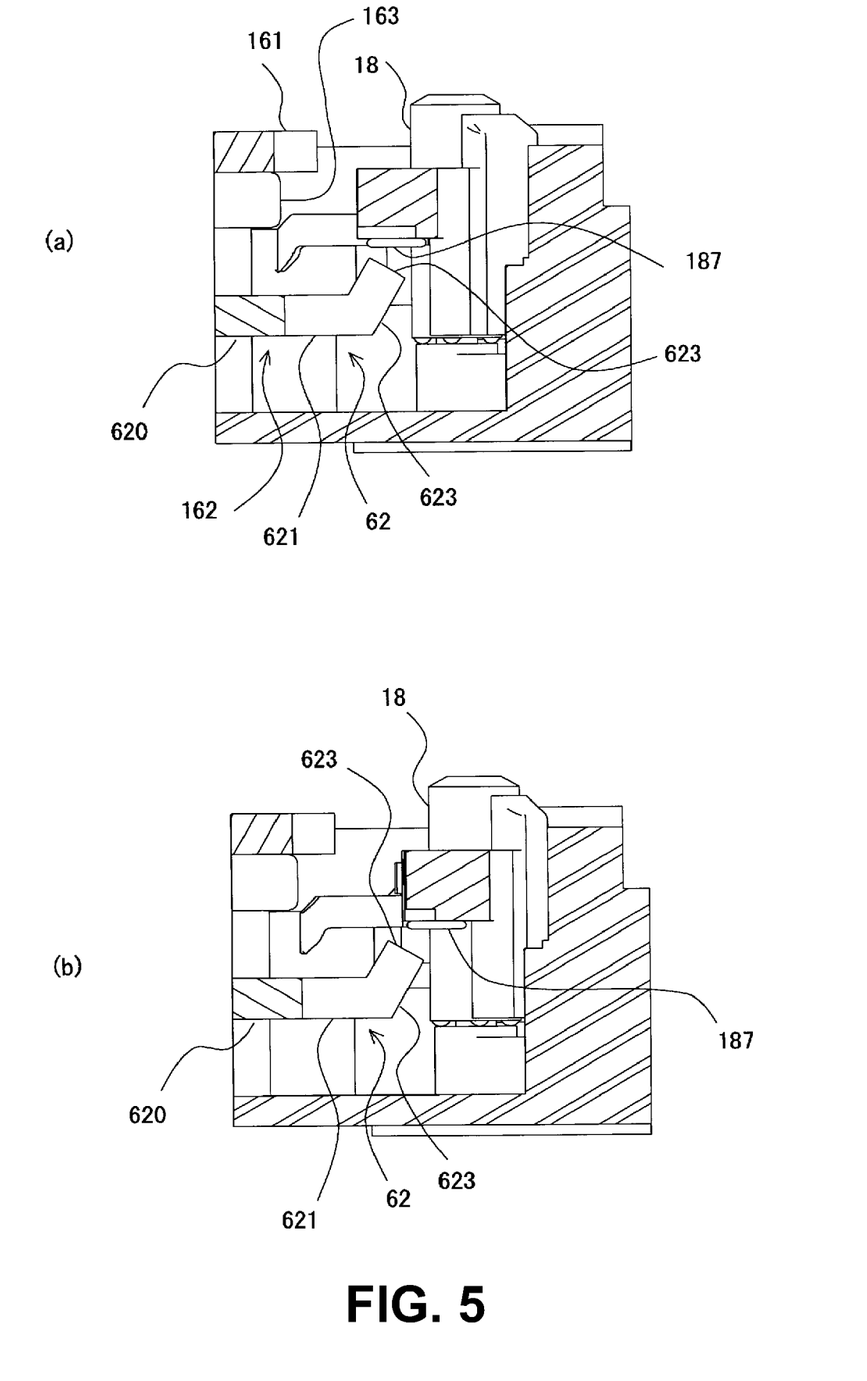
FIGS. 5(a) and 5(b) are drawings showing the positional relationship between the latch in an open state and a protrusion of a lower yoke, and the positional relationship between the latch in a closed state and the protrusion of the lower yoke, respectively, in accordance with an embodiment of the present invention.

With reference now to FIGS. 5(a) and 5(b), in accordance with an embodiment of the present invention, drawings are shown that illustrate the positional relationship between the latch in an open state and a protrusion of a lower yoke, and the positional relationship between the latch in a closed state and the protrusion of the lower yoke, respectively. FIG. 5(a) is a cross-sectional view cut along the line A-A in FIG. 4(a), and FIG. 5(b) is a cross-sectional view cut along the line B-B in FIG. 4(b). The magnetic bias force to the latch 18 acts between magnetic flux leakage from VCM 16 and the magnetic pin 187 attached to the latch 18. VCM 16 includes an upper yoke 161, a lower yoke 162, and a magnet 163. The magnet 163 is in contact with the upper yoke 161 and is affixed to the upper yoke 161, and is located between the upper yoke 161 and the lower yoke 162. The number of magnets may be one or two depending on the design.

Between the upper yoke 161 and the lower yoke 162, or between the magnet 163 and the lower yoke 162, magnetic flux is generated. The magnetic flux leakage from the upper yoke 161 and the lower yoke 162, or between the magnet 163 and the lower yoke 162, acts on the magnetic pin 187 so that a bias force acts to attract the magnetic pin 187 toward the VCM 16 so that the latch pivots to open (clockwise in FIGS. 4(a) and 4(b)). As shown in FIGS. 5(a) and 5(b), the lower yoke 162 includes a protrusion 62. There exists magnetic flux leakage from the protrusion 62 to generate magnetic flux leakage around the lower yoke 162. The magnetic pin 187 receives a large bias force by the magnetic flux leakage from the protrusion 62.

Figure 6:
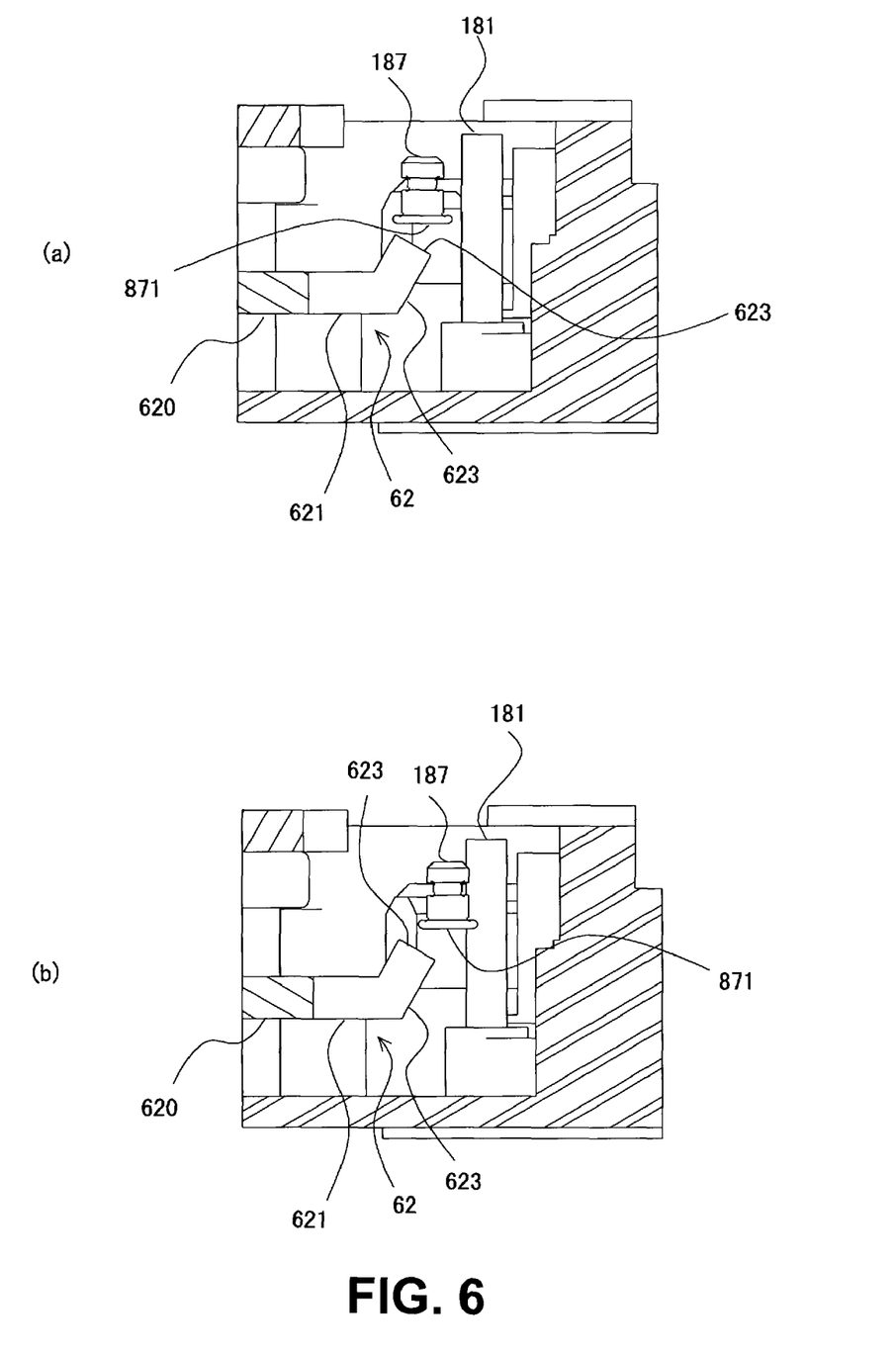
FIGS. 6(a) and 6(b) are drawings showing the positional relationship between a magnetic pin of the latch in an open state and the protrusion of the lower yoke, and the positional relationship between the magnetic pin of the latch in a closed state and the protrusion of the lower yoke, respectively, in accordance with an embodiment of the present invention.

With reference now to FIGS. 6(a) and 6(b), in accordance with an embodiment of the present invention, drawings are shown that illustrate the positional relationship between a magnetic pin of the latch in an open state and the protrusion of the lower yoke, and the positional relationship between the magnetic pin of the latch in a closed state and the protrusion of the lower yoke, respectively. FIGS. 6(a) and 6(b) shows the position of the magnetic pin 187 at the still open position and the position of the magnetic pin 187 at a stand-by closed position, respectively. FIGS. 6(a) and 6(b) are the drawings in which only the magnetic pin 187 in the latch 18 has been extracted from FIGS. 5(a) and 5(b), respectively. The magnetic pin 187 has a rugged appearance and is embedded and affixed in the body of the latch.

The protrusion 62 includes an arm 621 protruding outward, which is toward the latch 18, from a plate 620 of the lower yoke 162 and a tab 622 bending upward from the arm 621. In the configuration shown in the drawings, the arm 621 extends horizontally, which is vertical to the pivot shaft 181, from the plate 620. In one embodiment of the present invention, during manufacture, the arm 621 is horizontal, but may be slanted upward or downward. The tab 622 extends from the arm 621 toward the underside of the magnetic pin 187. An end face 623 is disposed at the tip of the tab 622, which is the tip of the protrusion 62. The end face 623 is slanted relative to a horizontal plane, which is a parallel plane to the recording surface of a magnetic-recording disk, or a vertical plane to the latch pivot shaft 181.

In application of an attracting force in the direction to open the latch to the magnetic pin 187 by the magnetic flux leakage from the protrusion 62, if the actuator 14 is brought into proximity with the magnetic-recording disk and the latch 18 is in the still open state (FIG. 6(a)), the vibration proof characteristics is increased by applying a large attracting force in the Z direction, which is the direction along the latch pivot shaft 181. On the other hand, for a satisfactory latching capability, in an embodiment of the present invention, the XY torque in the attracting force caused by the magnetic flux leakage is small so that the speed of pivotal movement of the latch from a closed state to an open state will not be too fast.

As shown in FIGS. 6(a) and 6(b), the end face 623 of the protrusion 62 is slanted downward from the inside of VCM 16 toward the outside. Hence, the position in height of the end face 623, which is the position in the Z direction such that the base bottom is a lower side and the top cover is an upper side, becomes higher as the magnetic pin 187 moves in the latch opening direction and becomes closer to VCM 16. The slant of the end face 623 results in that the Z-direction distance between the underside 871 of the magnetic pin 187 and the end face 623 becomes smaller as the magnetic pin 187 moves in the latch opening direction and becomes closer to VCM 16, and the protrusion 62.

The smaller the distance in the XY plane between the magnetic pin 187 and the end face 623, the stronger the Z-direction force to act on the magnetic pin 187. Moreover, the smaller the Z-direction distance between the underside 871 of the magnetic pin 187 and the end face 623, the stronger the Z-direction force to act on the magnetic pin 187. Accordingly, a stronger Z-direction force can be applied to the magnetic pin 187 at the still open position. Thus, in an embodiment of the present invention, when the actuator 14, which is attached to the head-slider 12, is brought into proximity with the magnetic-recording disk, vibration of the latch 18 in the still open state can be effectively suppressed.

In the configuration example of FIG. 6(a), when viewed in the Z direction, the edge closest to the magnet on the underside 871 of the magnetic pin 187 and the edge closest to the magnet on the end face 623 of the protrusion are substantially overlapped. The Z-direction force gradually increases while the latch 18 turns from a closed state to an open state and becomes strongest with the latch 18 in the open state.

On the other hand, the XY torque increases as the distance in the XY plane to the end face 623 decreases. The XY torque also increases as the Z-direction distance between the underside 871 of the magnetic pin 187 and the end face 623 decreases, but the increasing rate is smaller than that of the Z-direction force. Hence, the Z-direction force to the magnetic pin 187 at the still open position significantly increases because of the end face 623, but increase in the XY torque can be suppressed and made small. In this way, the above-described slanted end surface 623 of the tab 622 can increase the Z-direction magnetic bias force on the latch 18 at the still open position for suppressing vibration of the latch 18, and furthermore, can suppress increase in the XY torque for preventing the degradation of the latching capability, as well.

With reference now to FIGS. 7(a), 7(b) and 7(c), in accordance with an embodiment of the present invention, perspective views are shown that depict the structure of the protrusion 62. FIG. 7(b) is an enlarged view of the portion circled in FIG. 7(a). In the protrusion 62, the tab 622 is formed by bending relative to the arm 621 using a mechanical press. In one embodiment of the present invention, the slanted end face 623 may be formed by cutting; but, in another embodiment of the present invention, for manufacturing efficiency, the slanted end face 623 may be formed by using a mechanical press. In one embodiment of the present invention, the protrusion 62 has an arm 622 to adjust the position and angle of the end face 623; but, in another embodiment of the present invention, such a component equivalent to the arm may not be provided. This is the same in the other protrusion structures, which are subsequently described.

The manufacture of the lower yoke 162 forms a protrusion protruding straight from the plate 620 and bends the tip, so that the protrusion having the arm 621, the tab 622 and the end face 623 shown in the drawings can be formed easily. Adjustment of the length and the bend angle of the tab 622 yields the adjustment of the position in height, which is the position in the Z direction, of the center of the end face 623 and the slant angle. In this way, the arm 621 and the tab 622 allows easy positioning of the end face 623 at a designated position and slant. As understood from the above description, the slant angle of the end face 623 (a in FIG. 7(c)) is an important element for determining the Z-direction force and the XY torque to the latch 18.

Figure 8:
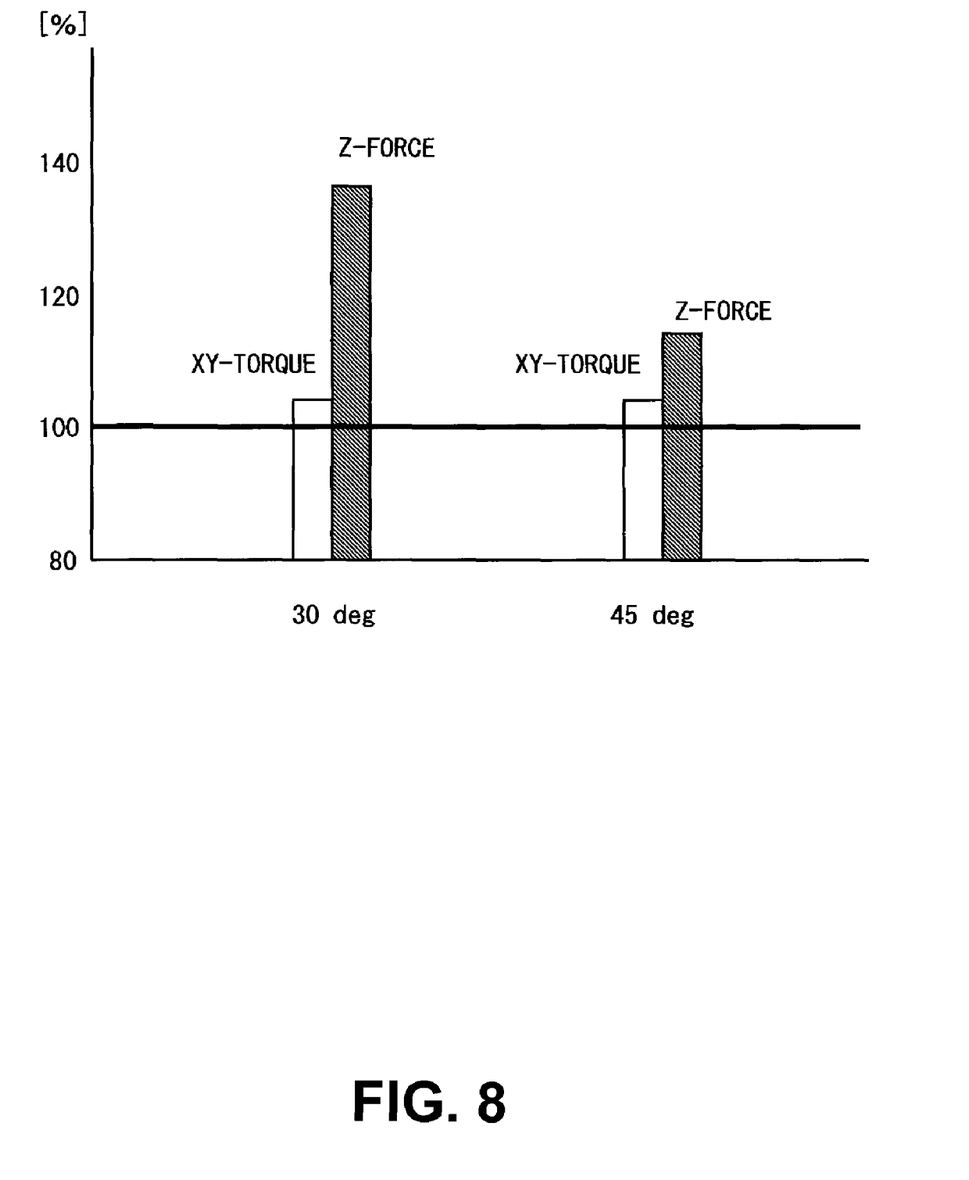
FIG. 8 is a bar graph that shows data illustrating the relationship between the slant angle of the end face of the protrusion of the lower yoke, the Z-direction force, and the XY torque, in accordance with an embodiment of the present invention.

With reference now to FIG. 8, in accordance with an embodiment of the present invention, a bar graph is shown of simulation data indicating the Z-direction magnetic bias force and the XY torque when the slant angle α is 45° or 30° with reference to the structure having the slant angle α of 0°, which is a horizontal end face. As seen in the graph of FIG. 8, at the slant angle α of 45° and 30°, the respective Z-direction forces are greater than and the respective XY torques are substantially the same as the references. Within the range of the slant angle α from 30° to 45°, in one embodiment of the present invention, the magnetic bias force can be applied to the latch 18.

With reference now to FIGS. 9(a) and 9(b), in accordance with an embodiment of the present invention, perspective views are shown that depict other shapes of the protrusion 62.

Figure 9:
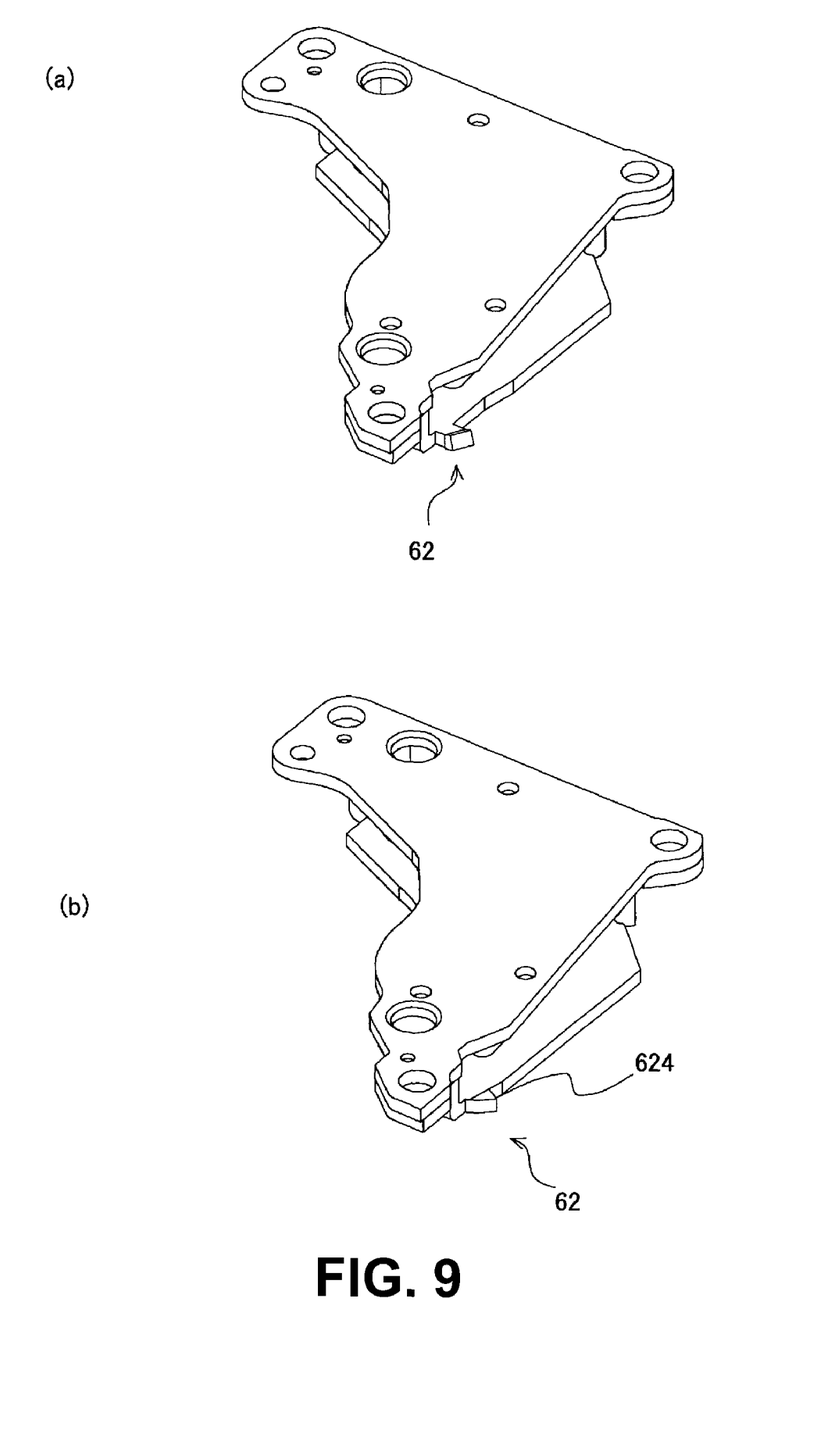
FIGS. 9(a) and 9(b) are perspective views showing protrusions for the lower yoke having other structures, in accordance with an embodiment of the present invention.

The protrusion 62 of FIG. 9(*a*) is bent obliquely along the path of the magnetic pin 187 drawing a circle. In other words, the tab 622 is bent upward in the Z direction and bent within the XY plane as well. Thus, in one embodiment of the present invention, the direction, which is obtained by projecting the normal of the end face 623 to the XY plane, can be brought closer to a tangential direction to a path of the magnetic pin 187 at the point when the magnetic pin 187 is at a still open position. Slanting the tab along the path of the magnetic pin 187 provides a long distance between the pin and the protrusion at a closed position so that the XY torque can be reduced. The protrusion 62 may be formed by cutting so as to be bent in the XY plane and subsequently bent in the Z direction.

Figure 7:
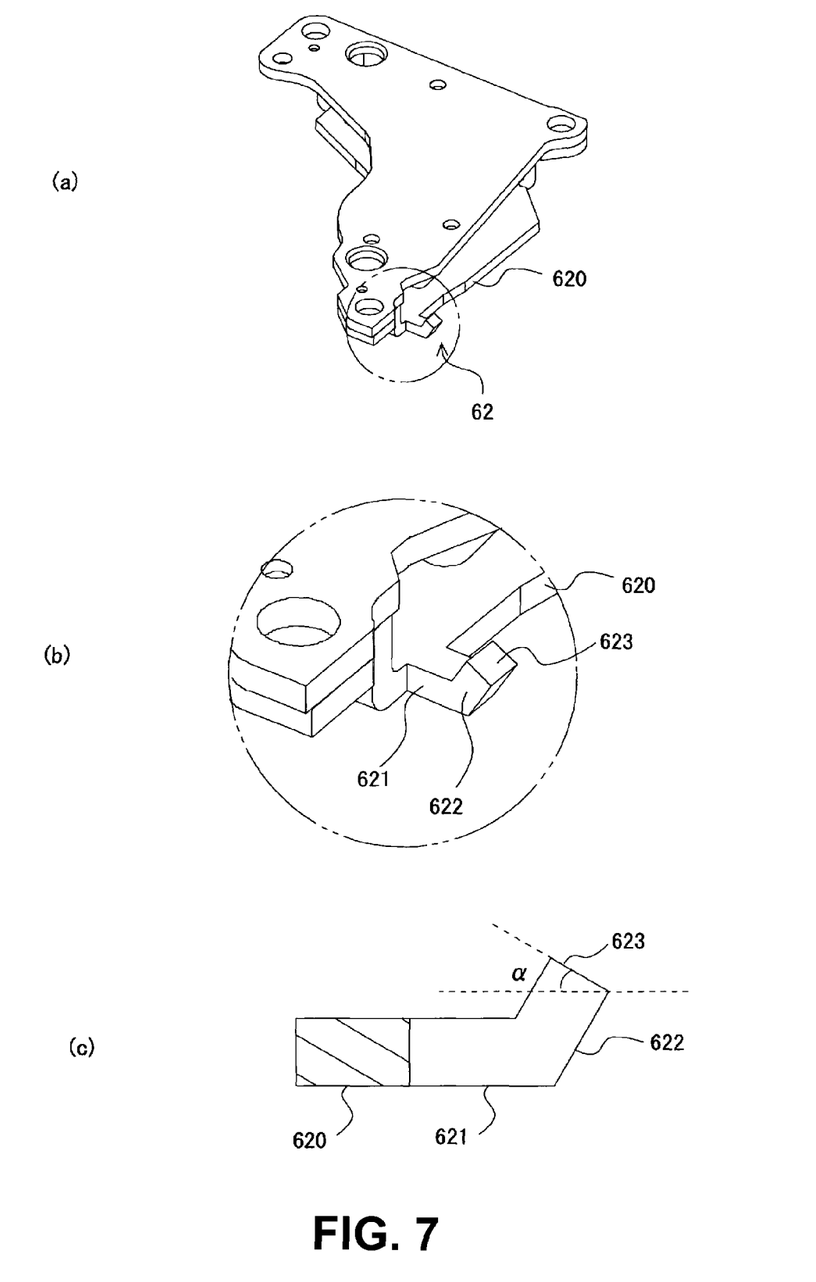
FIGS. 7(a), 7(b) and 7(c) are perspective views showing a structure of the protrusion of the lower yoke, in accordance with an embodiment of the present invention.

The protrusion 62 of FIG. 9(*b*) includes a triangular prism, protruding from the plate 620 of the lower yoke 162 and being bent upward. Hence, the top apex 624 is positioned at the uppermost end. Similar to the protrusion shape shown in FIGS. 7(*a*) and 9(*a*), the Z-direction distance between the magnetic pin 187 and the protrusion 62 becomes smaller as the latch 18 is brought closer to the still open position. Moreover, the apex 624, which is a point at an end, is at the highest position such that stronger Z-direction force can be applied to the magnetic pin 187 at the still open position.

Figure 10:
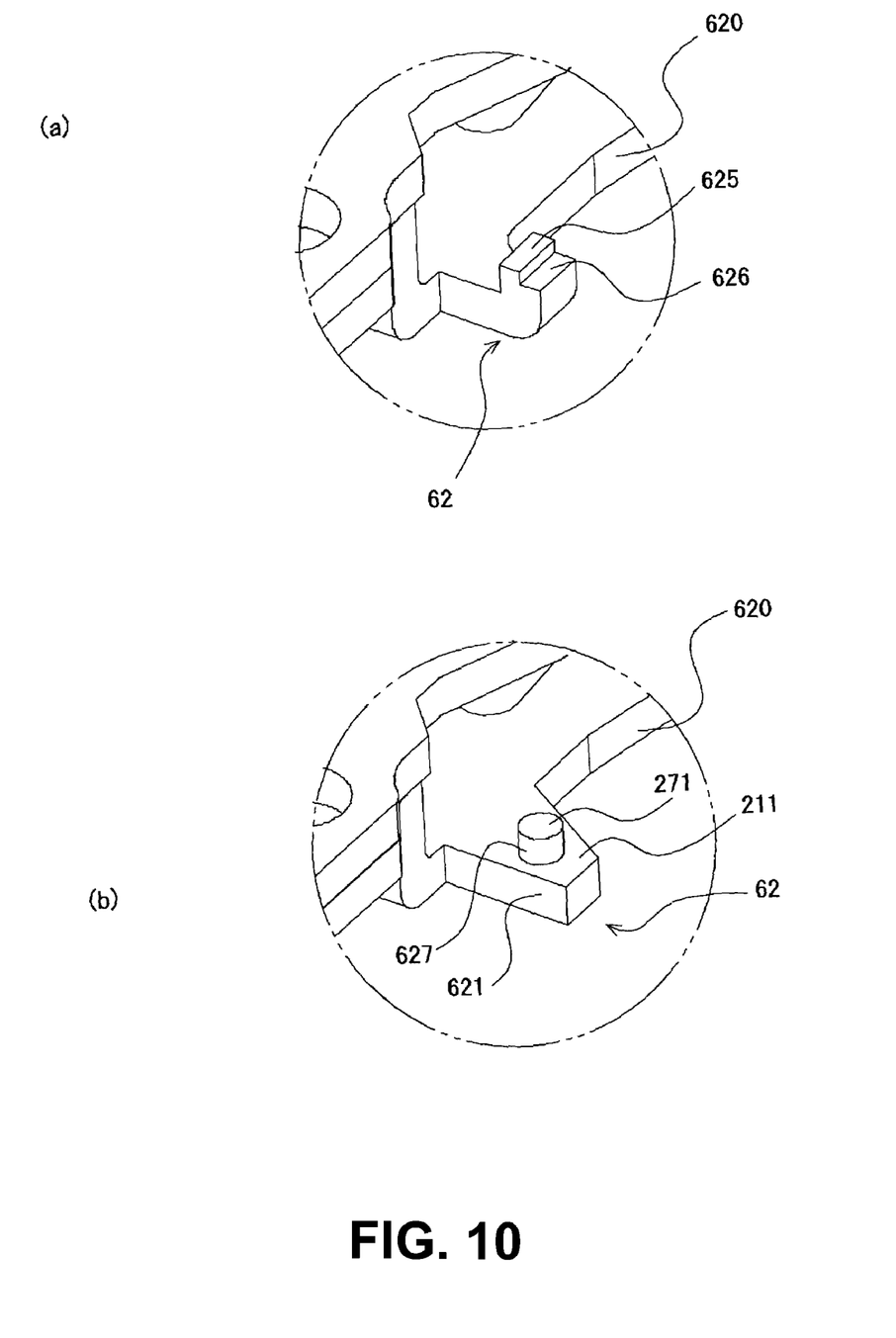
FIGS. 10(a) and 10(b) are perspective views showing protrusions for the lower yoke having still other structures, in accordance with an embodiment of the present invention.

With reference now to FIGS. 10(*a*) and 10(*b*), in accordance with an embodiment of the present invention, perspective views are shown that depict yet other shapes of the protrusion 62. The aforementioned protrusions 62 have a slant face but the present protrusion 62 includes a plurality of horizontal faces different in height. To increase the Z-direction force at the still open position without degrading the latching capability, in an embodiment of the present invention, a structure for the protrusion includes a slant continuously changing the height of the structure. However, a plurality of tiered faces different in height provides the latch 18 with a magnetic bias force appropriate for the position of the latch.

In the configuration of FIG. 10(*a*), the protrusion 62 includes a first horizontal face 626 and a second horizontal face 625 as the end faces of the tab 622. The second face 625 is located closer to the plate 620 than the first face 626 and the second face 625 is disposed next to the first face 626 in the direction where the magnetic pin 187 moves from the closed position to the open position. The second face 625 is located higher than the first face 626. Pressing a portion of the flat end face of the tab yields the easy formation of the first face 626.

Since the magnetic pin 187 at the still open position is close to the second face 625, the magnetic pin 187 receives a stronger Z-direction force. When the magnetic pin 187 is away from the still open position, the distance between the outer first face 626 and the magnetic pin 187 is larger than the distance between the second face 625 and the magnetic pin 187, so that the degradation in latching capability can be prevented. In an embodiment of the present invention, to enhance the Z-direction force, the magnetic pin 187 at the still open position is overlapped with at least a portion of the second face 625 when viewed in the Z direction.

In the configuration in FIG. 10(*a*), the first face 626 and the second face 625 are horizontal, but these faces 626 and 625 may be slanted by slanting the tab 622. Thus, the faces 625 and 626 have the same effect as the slanted end face 623 shown in FIG. 7. Alternatively, three or more faces different in height may be formed at the tip of the tab 622.

In the configuration in FIG. 10(*b*), the protrusion 62 includes a pin 627 standing on the top face of the horizontally extending arm 621. The pin 627 can be affixed easily onto the top face of the arm 621 by hammering. The top face 271 of the pin 627 is horizontal and is located higher than the top face 211 of the arm 621. To the magnetic pin 187 at a stand-by close position, a portion of the top face 211 of the arm 621 is closer than the top face 271 of the pin 627. The magnetic pin 187 at the still open position gets closer to the top surface 271 of the pin 627, so that the magnetic pin 187 receives a stronger Z-direction force.

The pin 627 is affixed away from the end of the arm 621. When the pin 627 is away from the still open position, the distance between the top face 211 of the arm 621 and the magnetic pin 187 is larger than the distance between the top face 271 of the pin 627 and the magnetic pin 187, so that the degradation of latching capability can be prevented. To increase the Z-direction force, in another embodiment of the present invention, the magnetic pin 187 at the still open position overlaps at least a portion of the top face 271 of the pin 627 when viewed in the Z direction.

As set forth above, embodiments of the present invention have been described by way of examples; but, embodiments of the present invention are not limited to the above-described examples. The above-described examples may be easily modified, added to, and converted within the spirit and scope of embodiments of the present invention. For example, in accordance with embodiments of the present invention, a HDD using a magnetic-recording disk has been described as a disk drive, by way of example without limitation thereto, as other recording methods that utilize alternative types of disk including alternative recording media within a disk drive are also within the spirit and scope of embodiments of the present invention. For another example, in accordance with embodiments of the present invention, the latch may be applied to a HDD employing a contact start and stop (CSS) scheme in which the actuator parks at an inner area of the magnetic-recording disk.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A disk drive comprising:
   a head for accessing a data recording area of a disk;
   an actuator for supporting said head and for pivoting to move said head;
   a voice coil motor, said voice-coil motor comprising:
      a voice coil,
      a magnet, and
      a yoke, said yoke disposed so as to overlap with said voice coil attached to said actuator in a direction parallel to a pivot axis of said actuator, said yoke for moving said actuator in response to an electrical current flowing through said voice coil interacting with a magnetic field of said magnet; and
   a latch configured to lock said actuator from pivoting on a pivot shaft toward a data recording area in response to an external force,
   wherein said latch is positioned at a closed position while being supported by a portion of said actuator when said actuator is positioned at a stand-by position, and is configured to pivot by application of a magnetic bias force which is induced by magnetic flux leakage from said voice coil motor such that said magnetic bias force is configured to act on a magnetic body of said latch with pivoting of said actuator from said stand-by position into proximity with said data recording area such that said latch is configured to stop at an open position;

said yoke comprising a protrusion that protrudes toward a magnetic body of said latch when said latch is in an open position, wherein said protrusion is located at a lower position than said magnetic body; and said protrusion comprising a tip that increases in height in a direction in which said magnetic body is configured to move toward when said latch is in said open position.

2. The disk drive of claim 1, wherein said tip of said protrusion comprises an end face of a slant increasing in height in said direction in which said magnetic body is configured to move toward said open position.

3. The disk drive of claim 2, wherein said protrusion comprises:

an arm extending from a plate of said yoke toward said latch; and a tab bent upward from said arm; and wherein an end face of said tab is said end face of said slant.

4. The disk drive of claim 2, wherein a slant angle of said end face of said slant ranges from 30° to 45°.

5. The disk drive of claim 2, wherein a normal to said slant is disposed toward a tangential direction to a path of said magnetic body at said open position.

6. The disk drive of claim 1, wherein said tip of said protrusion comprises an apex at a highest position.

7. The disk drive of claim 1, wherein said tip of said protrusion comprises:

a first-tier face; and a second-tier face, said second-tier face located next to said first-tier face in said direction of movement of said magnetic body toward, and disposed at a higher position than said first-tier face.

8. The disk drive of claim 7, wherein said protrusion comprises:

an arm extending from a plate of said yoke toward said latch; and a tab bent upward from said arm; and wherein an end face of said tab comprises said first-tier face and said second-tier face.

9. The disk drive of claim 7, wherein said protrusion comprises:

a horizontally extending arm; and a pin standing on a top surface of said arm at a location away from an end of said arm; and wherein an end of a top face of said arm is said first-tier face and a top face of said pin is said second-tier face.

* * * * *